UNITED STATES PATENT OFFICE.

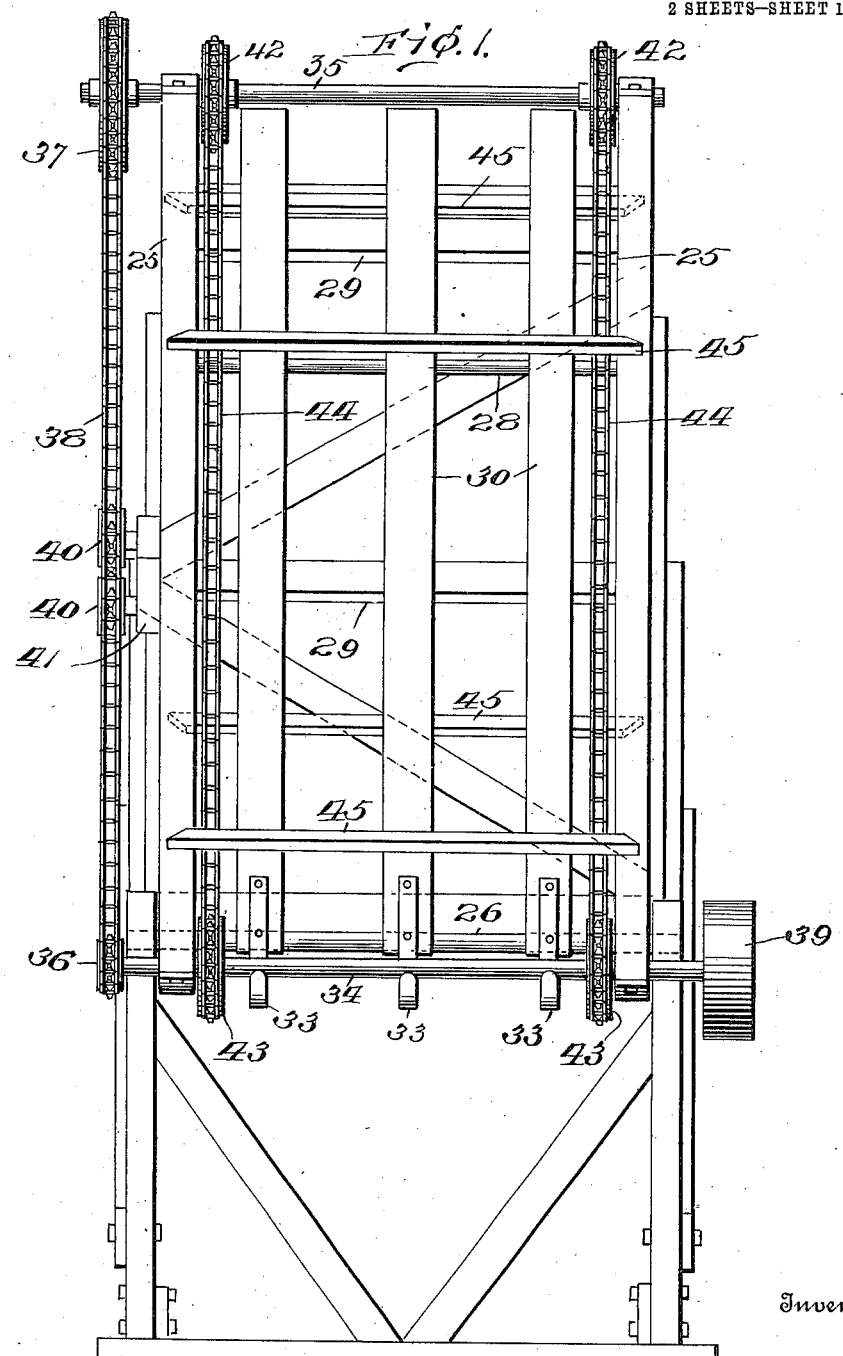

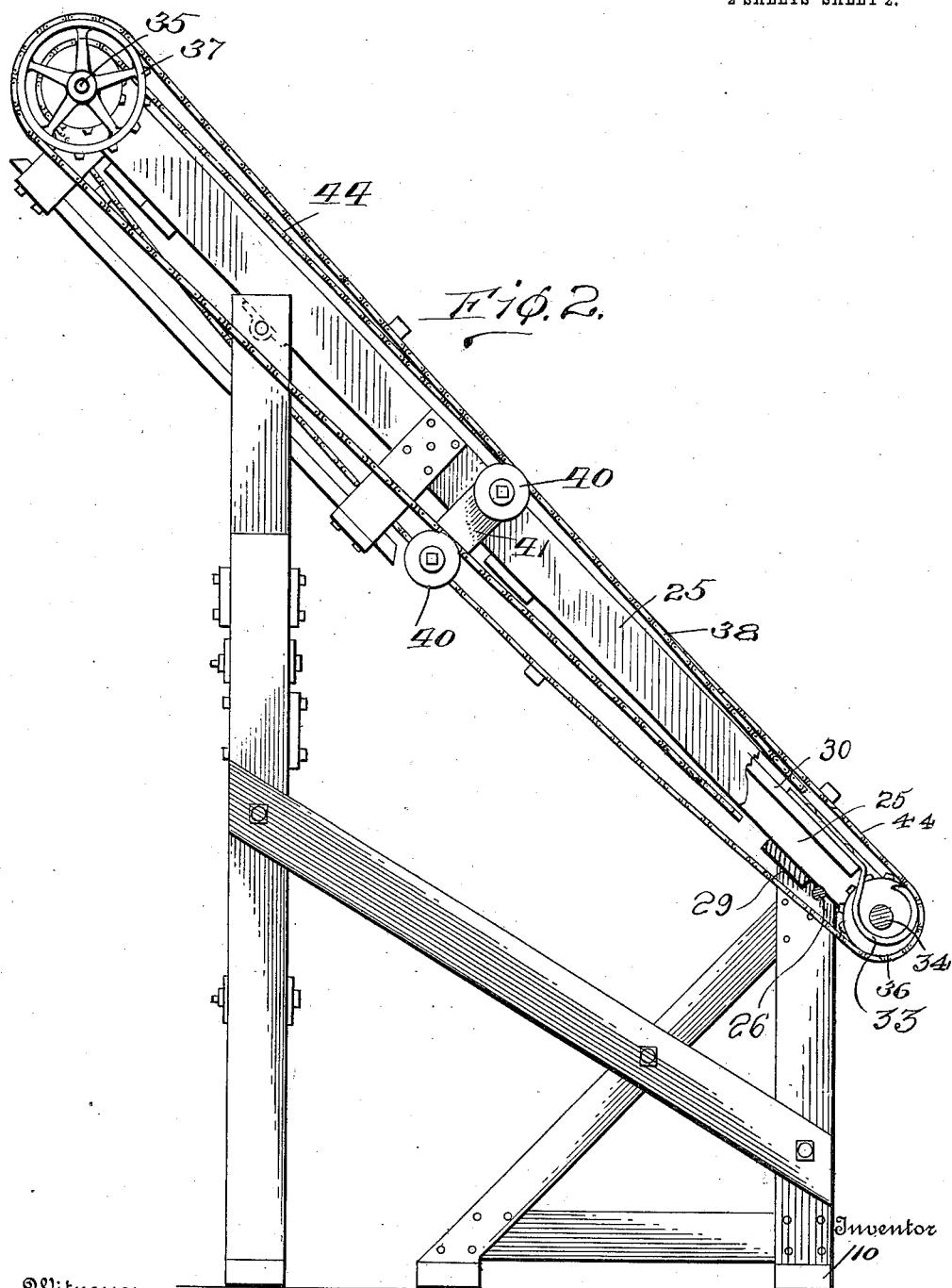

HENRY C. BURKLE, OF TORONTO, KANSAS.

BALE-CONVEYER.

1,093,531.  Specification of Letters Patent.  Patented Apr. 14, 1914.

Application filed May 28, 1912. Serial No. 700,238.

*To all whom it may concern:*

Be it known that I, HENRY C. BURKLE, a citizen of the United States, residing at Toronto, in the county of Woodson and State of Kansas, have invented certain new and useful Improvements in Bale-Conveyers, of which the following is a specification, reference being had therein to the accompanying drawing.

This invention relates to a bale conveyer and has for its object the production of a simple and efficient means for holding the bale in position upon the same until the bale is engaged by one of the flights for moving the same up the flight of the conveyer.

With this and other objects in view this invention consists of certain novel combinations, constructions and arrangements of parts as will be hereinafter fully described and claimed.

In the accompanying drawing: Figure 1 is a front elevation of the conveyer. Fig. 2 is a side elevation of the conveyer, a portion of the same being partly broken away.

Referring to the accompanying drawing by numerals, it will be seen that any suitable frame may be used for this device, as illustrated by 10. This frame may be adjustable or stationary, but it is preferred that a frame be used which will support the conveyer so as to have one end higher than the other end thereof, for passing bales into the mow, or any other place where it is desired to move boxes and bales from a low point to a high point, thereby lifting the same. The side portions 25 are mounted upon a shaft 26, this shaft being carried by the frame 10. The upper end of the conveyer may be supported upon a bar or any other suitable means for holding the same in its correct position. A supporting bar 28 connects the sides 25 and supports longitudinally extending bars 30 upon which the bale is adapted to rest. Hooks 33 are mounted upon the lower ends of the bars 30, these hooks being adapted to hold the bale in position so that it can be engaged by conveying means, thus making it unnecessary for the operator to hold the bales upon the bars while waiting for the conveyer to engage the bales.

Shafts 34 and 35 are carried by the lower and upper ends of the side bars 25 respectively and carry the sprocket wheels 36 and 37 at their outer ends. The sprocket wheels are rigidly mounted upon the shaft so that the sprocket chain 38 will convey rotary movement from the shafts 34 and 35. The shaft 34 may be rotated by any suitable means which may be connected to the pulley 39. Supporting wheels 40 are mounted upon the block 41 and support the sprocket chain intermediate its length so there is no danger of the sprocket chain slipping off the sprocket wheels.

Sprocket wheels 42 are rigidly mounted upon the shaft 35, and sprocket wheels 43 are rotatably mounted upon the shaft 34 so that the rotation of the shaft 34 will not convey any direct rotation to the sprocket wheels 43. Sprocket chains 44 connect the sprocket wheels 42 and 43 and carry the flights 45 which are intended to engage the bale adjacent the hooks 33 and convey it up the bars 30. When using this device, the machine is set up adjacent a loft or other structure to which it is desired to lift the bales, so that the upper end of the conveyer extends above the loft or the structure to which the bales are being conveyed. Suitable operating means is connected with the pulley 39 and this rotates the shaft 34 and through the chain 38 conveys rotary movement to the shaft 35. The rotation of the shaft 35 causes the chains 44 to pass thereover, thus drawing the flights 45 up the conveyer frame. If a bale is placed upon the bars 30 owing to the incline of the bars 30 the bale will slide down into engagement with the hooks 33. As the chains 44 are moved, one of the flights 45 passes around the wheels 43 and the hooks 33 and upon coming into engagement with the bale held by the hooks, carries the same up the bars 30 and dumps it over the end of the conveyer upon the floor of the loft or any other structure.

By referring to Fig. 2 it will be seen that the hooks 33 are carried by the longitudinal bars 30. It will further be noted that the shaft 34 is positioned in the lower portion of the hooks 33 so as to allow the bales or boxes to be engaged by the hooks without resting upon the shaft 34, and in this manner the shaft 34 will be allowed to freely rotate without interference from the bales or boxes.

From the foregoing description it will be seen that a simple means has been provided for holding a bale or box in position upon an inclined conveying surface for allowing the same to be conveyed without interference to the working parts.

Having thus described my invention, what is claimed is:—

In a device of the class described, the combination with a frame provided with an inclined endless conveyer, said conveyer provided with a plurality of transversely extending flights, of a plurality of hooks carried by the lower end of said frame adjacent the end of said conveyer, to hold the article to be conveyed upon said frame, said transversely extending flights of said conveyer passing around the outer portion of said hooks and engaging the article carried by said hooks for conveying the same.

In testimony whereof I hereunto affix my signature in presence of two witnesses.

HENRY C. BURKLE.

Witnesses:
J. D. CANNON,
W. H. KALTENBOCH.

Copies of this patent may be obtained for five cents each, by addressing the "Commissioner of Patents, Washington, D. C."